March 13, 1962     CY ROMM     3,024,688
CONTINUOUS AUTOMATIC DIE CUTTING MACHINE
Filed June 23, 1959     4 Sheets-Sheet 1
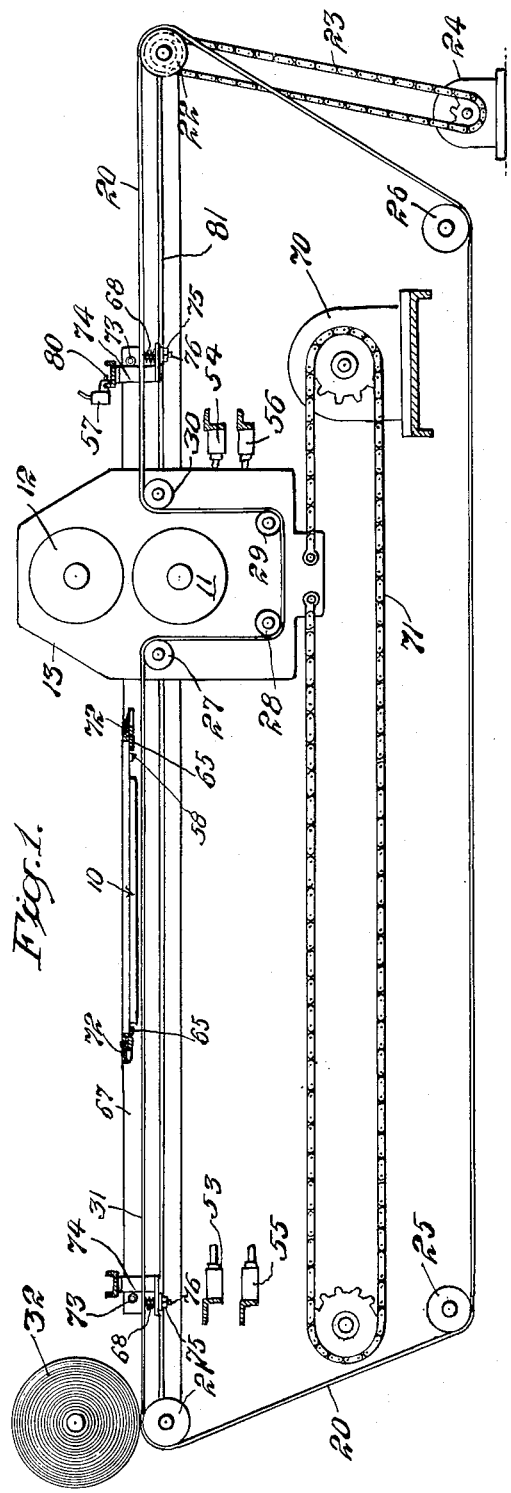
INVENTOR.
CY ROMM
BY
ATTORNEY

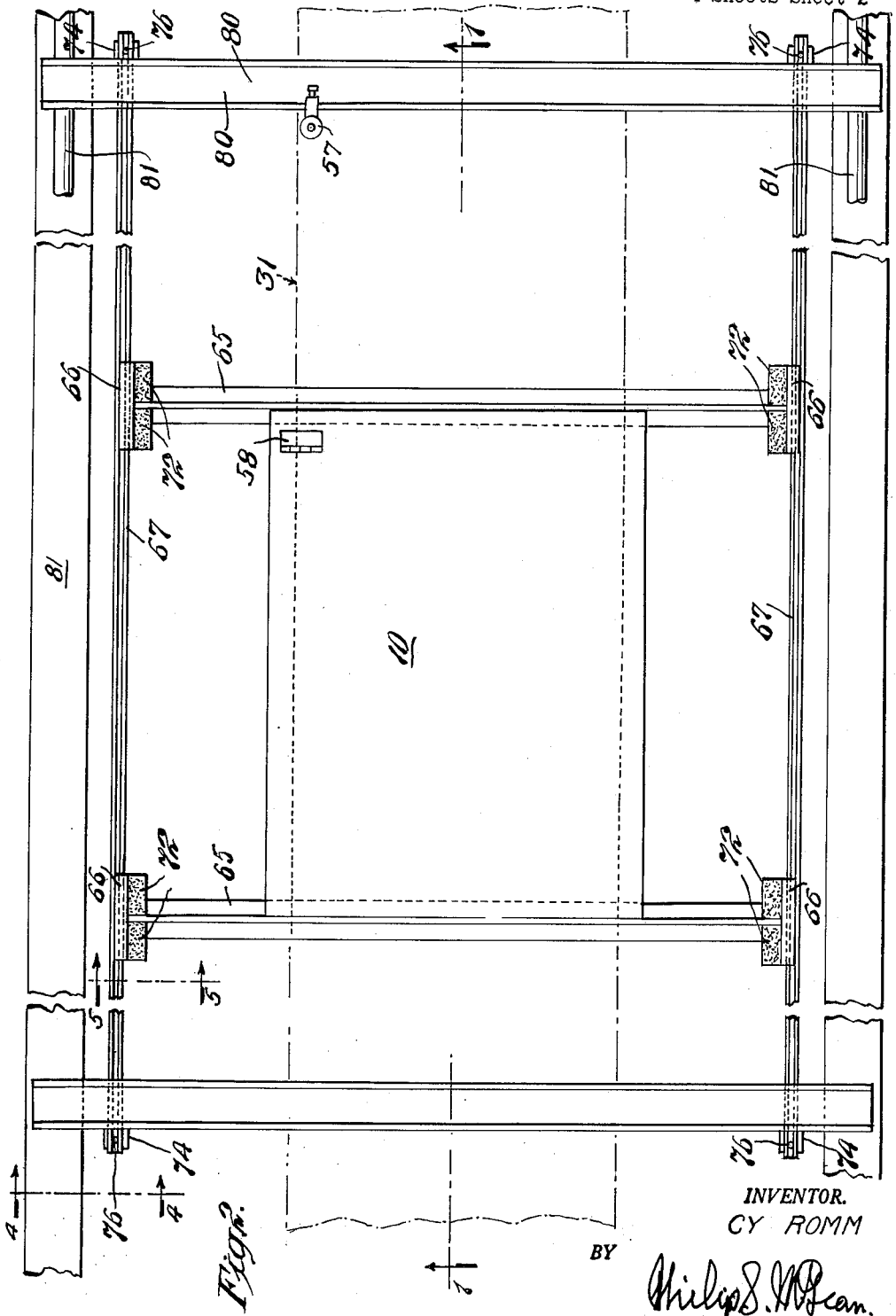

March 13, 1962 CY ROMM 3,024,688
CONTINUOUS AUTOMATIC DIE CUTTING MACHINE
Filed June 23, 1959 4 Sheets-Sheet 3
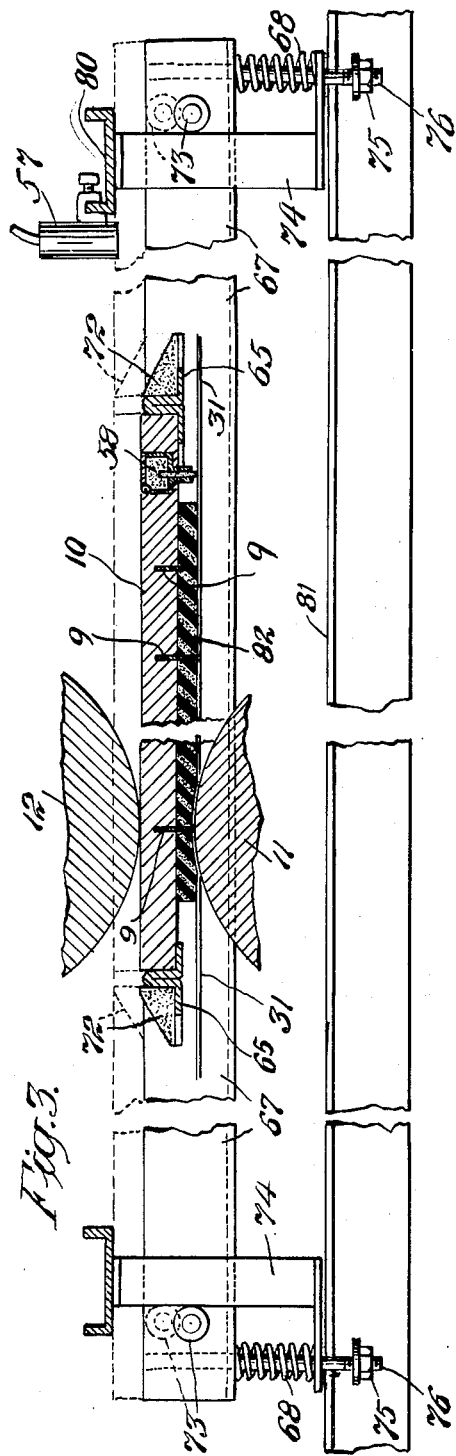
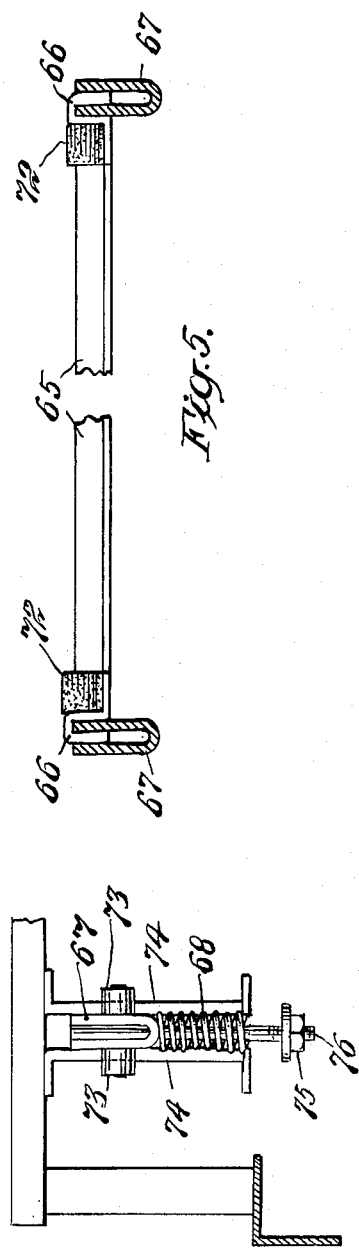
INVENTOR.
CY ROMM
BY
ATTORNEY March 13, 1962 CY ROMM 3,024,688
CONTINUOUS AUTOMATIC DIE CUTTING MACHINE
Filed June 23, 1959 4 Sheets-Sheet 4

INVENTOR.
CY ROMM
BY
Philip S. McBean
ATTORNEY

United States Patent Office 3,024,688
Patented Mar. 13, 1962

3,024,688
CONTINUOUS AUTOMATIC DIE CUTTING MACHINE
Cy Romm, 1287 Atlantic Ave., Brooklyn, N.Y.
Filed June 23, 1959, Ser. No. 822,291
5 Claims. (Cl. 83—155)

The invention herein disclosed relates to die cutting machines of the type covered by Patent 2,757,728 of August 7, 1956, in which the material is cut by dies supported in floating relation between the opposing crowns of companion pressure rolls.

Particular objects of the present invention are to provide a machine of this description adapted to operate automatically on a continuous length of material taken from a supply roll or other such source.

Further special objects of the invention are to provide a machine of such character adapted to accommodate cutting and scoring dies of all various shapes and which can be placed in the machine in any desired order or arrangement without requiring make-ready or other preliminary service or attention.

Other special objects of the invention are to provide a machine such as indicated which will automatically carry off or deliver the pieces as cut from the stock and automatically feed in fresh material as the cut products are cleared from the dies and removed.

Further objects of the invention are to accomplish the cut product removing and fresh material supplying operations smoothly and efficiently without shock or strain, utilizing the principle of an intermittent conveyor belt and storing power in idle periods to start and carry on the belt in the feed intervals.

Special objects are to provide means by which materials to be cut are carried to, through and away from the cutting cycle rather than being pushed or pulled, thus to eliminate distortion or other effect on materials and more particularly on materials of the resilient type such as rubber and plastics.

Other important objects of the invention are to provide a machine having such novel features and advantages in a practical low cost form of rugged, trouble free construction.

Other desirable objects accomplished by the invention and further novel features through which the purposes of the invention are attained are set forth and will appear in the course of the following specification.

The drawings accompanying and forming part of the specification are illustrative of a present commercial embodiment of the invention. Structure however may be modified and changed as regards the immediate illustration, all within the true intent and scope of the invention as hereinafter defined and claimed.

FIG. 1 in the drawings is a longitudinal and part broken sectional view illustrating component parts of the invention.

FIG. 2 is an enlarged broken plan view illustrating particularly the adjustable means for supporting the dies in self-adjusting relation to pass between the pressure rolls.

FIG. 3 is an enlarged broken sectional view illustrating passage of the dies between the pressure rolls.

FIG. 4 is a broken part sectional view on substantially the plane of line 4—4 of FIG. 2 illustrating the mounting of the die supports on the frame of the machine.

FIG. 5 is a cross sectional view as on the plane of line 5—5 of FIG. 2 illustrating the adjustable mounting of the die supporting bars.

Figure 6:
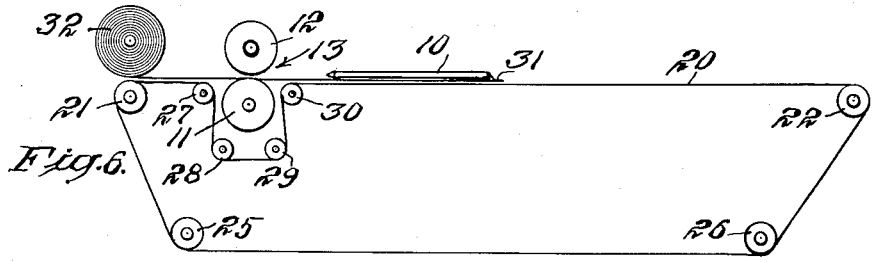
FIGS. 6 through 10 are diagrammatic views illustrating operation of the machine.
Figure 7:
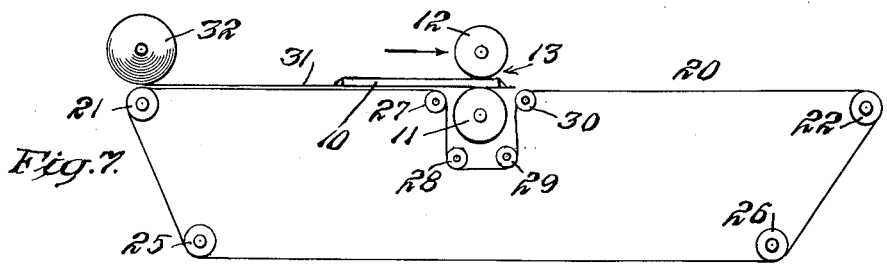
Figure 8:
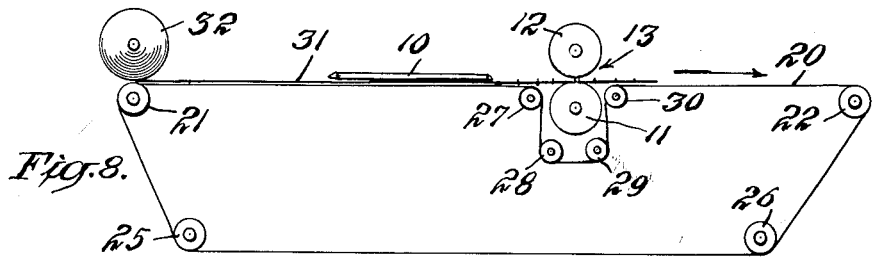
Figure 9:
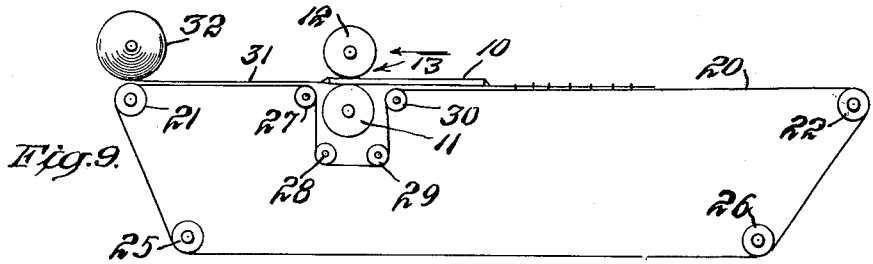
Figure 10:
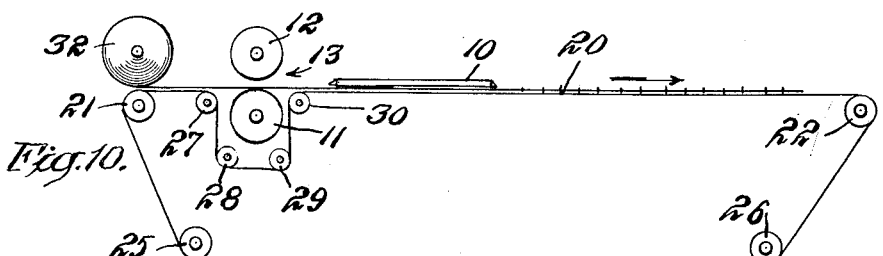

FIG. 6 showing the rolls at one side of the dies with material from the supply roll in position beneath the dies, supported on the conveyor belt;

FIG. 7 shows the companion rolls passing over the dies while the conveyor belt is detoured about the lower roll so as to not pass between the rolls, leaving parts cut by the rolls supported on the belt;

FIG. 8 shows the rolls as having passed over the dies and completed the cut, these rolls then remaining stationary while the belt is advanced to carry off the cut pieces and to feed fresh material beneath the dies;

FIG. 9 shows how with the belt at rest the rolls are started back over the dies to complete a second cut as they approach the original start position;

FIG. 10 shows the rolls as having reached the first position of rest, after completing the second cut and the belt as again started to remove the cut pieces and advance fresh stock beneath the dies.

FIGS. 11 and 12 are broken side and plan views of a modified form of electric eye for stopping the belt; FIG. 12 taken on the plane of line 12—12 of FIG. 11.

FIG. 13 is a broken detail of the dual motor drive for the belt.

In FIGS. 1 and 3 it will be seen that the machine of the present invention is similar to that disclosed in Patent 2,757,728, in having the dies, shown as steel rule strips 9 set in boards 10, mounted to pass between companion pressure rolls 11 and 12, journaled in a carriage 13 reciprocated by motor 70 through chain connections 71.

In the present machine, however, no table is required for supporting the work and in place of that there is provided a belt which feeds the material to be cut into position beneath the dies and takes the material after it is cut away from beneath the dies.

A special feature of this belt conveyor is that it is diverted or detoured about the lower pressure roll so that it does not pass between the rolls and hence is not subjected to the cutting dies.

This conveyor belt as shown at 20 is supported at opposite ends of the machine on rollers 21, 22, the latter driven by chain 23 from geared motor 24. The lower reach of the belt is directed by guide rollers 25, 26.

To pass this belt up to and beyond the pressure rolls without actually passing in between these rolls diversionary guiding and supporting rollers are provided on the carriage directing the belt angularly away from the nip of the rolls, about the lower roll and back to the feed line.

Specifically these rollers for carrying the belt away from the dies and away from the bite of the pressure rolls, about the rolls and back to the feed line are indicated at 27, 28, 29, 30, the rollers 27 and 30 supporting the belt at the feed line level at opposite sides of lower roll 11 and rolls 28, 29, holding the belt backed away and directed about the lower roll.

In travel of the carriage in opposite directions, with the belt stationary, it, the belt, simply rides over the guide rollers 27, 28, 29, 30, diverted or detoured about the lower pressure roll 11.

To enable practically continuous operation the stock or material to be cut 31, is supplied from a roll 32 located at the entrance end of the machine and drawn out over the belt into position beneath the die or dies at 10.

The diagrammatic views FIGS. 6 to 10 illustrate the cooperative action of the various parts of the machine.

FIG. 6 shows the pressure rolls at the left hand side of the die with the material to be cut, 31, supported on the belt beneath the die.

Then, with the belt stationary, the roll carrying carriage 13 is advanced as indicated in FIG. 7 to carry the pressure rolls 11, 12 over and below the die and material, the belt in this area being detoured about the lower roll by the diverting guide rollers 27, 28, 29, 30.

After the cut is completed and the rolls have passed beyond the die as in FIG. 8 the belt is started to carry the cut portion or cut pieces out to the delivery end of the machine and to draw in fresh material beneath the die.

With cut portions disposed of and fresh material beneath the die the belt is stopped and the pressure rolls are carried back over the die as indicated in FIG. 9.

When this second or return cut is effected as in FIG. 10, with the rolls clear of the die the belt is again started to deliver the cut parts and to feed fresh material beneath the die.

The controls for effecting the sequential operations described may be in the form of sequentially operating switches connected to control the carriage and belt operating motors.

The carriage travel in opposite directions may be governed by limit switches adjustable to determine carriage movement in each direction and belt operation may be effected by switches located to be actuated by the carriage at the end of its travel in each direction to start the belt and electric eye switch mechanism adapted to stop the belt advancing motor at the end of a belt movement approximating the effective length of the cutting die and to start movement of the carriage in the opposite direction.

The adjustable limit switches for the roll carriage motor 70 and chain drive 71 are indicated at 53, 54 and the switches for starting the belt motor at the end of travel of the carriage in opposite directions are indicated at 55, 56.

The electric eye for stopping the belt and starting the carriage is indicated at 57, FIGS. 1 and 3, and it may be connected and arranged to detect a mark, such as a trademark, name of the manufacturer or the like 58 impressed by a printing device carried by or attached to the die. This belt stopping and carriage starting switch is shown longitudinally adjustable to different die lengths by mounting the bar 80, carrying the switch in longitudinally adjustable relation on supporting rods 81, at the sides of the machine, FIG. 2.

As an alternative method of predetermining the length of belt travel, a tape 59, FIG. 11, approximating the desired length of belt travel may be looped over a pulley 60 on the shaft of the outer belt supporting roller 22, carrying a mark 58 which will pass under the switch eye 61 when the belt has made the desired length of travel.

To take up the load of starting the belt an inertia motor 62 may be utilized, this motor running continuously when the machine is in use and being coupled to drive the belt by a clutch indicated at 63, FIG. 13, arranged to be closed by the carriage actuated switches 55, 56 and to be opened by the electric eye switches 57, 61.

In setting up the machine it may be desirable to shift the belt back and forth in opposite directions. To accomplish this jogging action a reversible motor 24 may be provided controlled by manually operable reversing switches and connected to drive the belt in either direction independently of the inertia motor, these connections being such as to permit the manually controlled reversible motor to rest or to simply coast when the machine is thrown into automatic operation with the inertia motor carrying the belt load.

The supports for the cutting dies in addition to being such as to permit passage of these dies between the pressure rolls, are preferably of a yielding character to permit the dies to center between the rolls and to effect clean cutting of the material.

In the illustration, FIGS. 2 to 5, the dies 10 are shown supported on the flanges of angular cross bars 65 having hooked ends 66 engaged over the edges of U-shaped section longitudinal bars 67, at and clear of the ends of the rolls, which are yieldingly supported at their ends by springs 68.

The gearing for driving the pressure rolls and the mechanism for relatively adjusting the rolls to suit the thickness of the dies is not shown since these may be the same as illustrated in Patent 2,757,728.

The adjustable, yielding die supports enable dies of different size and shape to be quickly placed in the machine in any desired order and in any desired number and the action of the machine can be quickly adjusted to accommodate such dies.

Because of the continuous automatic action the machine may be operated at a high production rate.

To enable operation of all parts of the machine to be observed and the machine operated accordingly the manual starting, stopping, reversing and other switch mechanisms may be all combined on a portable panel connected with the control box on the machine by cable so that one man may fully control the machine while standing or walking about in different positions to fully observe all actions of the machine.

While in the machine illustrated the pressure rolls are tracked by a reversible carriage passing over a stationary die or dies it is contemplated that the action may be reversed, with the rolls remaining stationary and the die or dies being reciprocated between the rolls.

By supporting the dies in a horizontally disposed open frame resiliently mounted on the bed of the machine by coil springs at the four corners of the frame, the frame and the dies carried thereby are permitted cushioned vertical movement enabling opposite upper and lower extremities of the dies to come in direct contact with the crowns of the upper and lower rolls, thus avoiding any need for shims or make-ready adjustments. The invention also eliminates any need for die plates or bed plates, heavy tables or the like such as commonly associated with die cutting machines.

Inclined or wedge shaped rubber cushions 72 on the die frame, by engagement with the upper roll yieldingly depress the die frames and serve as shock absorbers to start the dies between the rolls.

Rollers 73, FIGS. 3 and 4, by engagement with fixed upright standards 74 guide the die frames in these vertical movements and nuts 75 on the lower ends of the bolts 76 which carry the spring 68 may be turned to limit the vertical movement and adjust the upper position of the die frame.

In considering the diagrammatic views, FIGS. 6 to 10, it will be realized that the dies indicated at 10 are at the upper level free of the material in FIGS. 6, 8 and 10 and are in the lower posiiton, depressed by the upper roll in FIGS. 7 and 9. The broken line in FIG. 3 indicates the upper position of the resiliently supported die frame and dies carried thereby.

For some purposes the dies may be reversed, with the cutting edges faced upward for cutting stock of limited size which may be placed directly on the dies, this being a completely manual operation in which the belt would not be used.

Also the machine may be used for cutting separate pieces of stock, setting or adding additional switches as required, controlling the carriage and belt movements accordingly.

By yieldingly supporting the dies at an upper level, above the cutting plane the material can be fed into position beneath the dies and after cutting is effected and the dies are clear of the rolls the lifting movement effected by the spring supports serves to clear the dies of the cut material, assisted by stripper pads 82.

While material is shown supplied from only a single roll 32, it is contemplated that several layers of material may be cut at the same time, supplied from different rolls.

It will be seen that in this machine the material is carried to and passed through the cutting stages without stretching or otherwise distorting the same.

While pulley 60, carrying the tape 59, which controls stopping of the conveyor belt is shown in FIGS. 11 and 12 as larger than the belt supporting and guiding roller 22, it will be realized that this pulley may be of the same diameter as the roll, in which case the tape travel would exactly correspond to that of the belt.

In this invention the dies and the cooperative pressure rolls between which the die and the material passes constitute the companion elements of the die cutting couple and the conveyor belt constitutes the means for feeding the material up to the pressure rolls and taking the cut material away from the other side of the rolls and in such movement being by-passed about these rolls.

Controls for the belt and the carriage carrying the pressure rolls cause the belt after advancing the material to the dies to stop and wait while the carriage, with the rolls, completes its passage over the dies and material and the carriage then to stop and wait while the belt takes away the material just cut by the rolls and advances a fresh supply of material to the dies.

These operations may be wholly automatic enabling the machine to continue in operation so long as the material to be cut is supplied to it.

What is claimed is:

1. A die cutting machine comprising the combination of a horizontally disposed downwardly acting cutting die, companion pressure rolls spaced vertically to die-cut material between the crowns of the rolls, means for supporting said die so as to pass between said rolls, a belt for conveying material to be cut to and for removing cut material from the rolls, means for guiding said belt beneath said die to the entry side of said rolls and for leading that portion of the belt in the region of the rolls downward in a loop about the lower roll and back to the opposite delivery side of the rolls, means for reciprocating the rolls in opposite directions over said die to positions of momentary rest beyond opposite ends of the die, including a reciprocating carriage on which said pressure rolls are journaled and means for intermittently reciprocating and resting said roll carrying carriage, said means for guiding said belt including guide rollers on said carriage for directing the belt from the entry side of the pressure rolls in a loop about the lower pressure roll, back to the delivery side of the pressure rolls and on which guide rollers the loop portion of the belt is movable while the carriage is being reciprocated, and means for intermittently advancing said belt an approximate die-length during each period of rest of said roll carrying carriage and for resting said belt during each period of travel of the pressure rolls.

2. The invention according to claim 1 in which said means for supporting said die is arranged to yieldingly support the die at an upper level above the crown of the upper roll and whereby the die will be depressed by the upper roll and then will lift after leaving the upper roll to release the die from the cut material.

3. The invention according to claim 1 in which said means for supporting said die comprises vertically yieldable means supporting said die at a higher level and shock absorbing means engageable by one of said pressure rolls for depressing said die to a lower level in a plane for passage between said rolls.

4. In a die cutting machine, the combination of a die for cutting sheet material and pressure rolls spaced for passage of said die and the material to be cut between the crowns of said rolls, said die and pressure rolls constituting the cooperating companion elements of a die-cutting couple, means supporting one of said elements in relatively stationary relation, a reciprocating carriage mounting the other of said cooperating elements, a conveyor belt for supporting and feeding sheet material to one side of said cooperating elements and for removing the die cut material from the opposite side of said cooperating elements, means for guiding said conveyor belt to and away from said pressure rolls including guide rolls on said carriage over which said belt is looped away from passage between the pressure rolls and back to the opposite side of the pressure rolls so as to support and feed sheet material to one side of said pressure rolls and to conduct material cut between the pressure rolls away from the opposite side of said rolls, means for alternately reciprocating and holding said carriage stationary and means for advancing said belt while the carriage is held stationary and for holding the belt relatively stationary while the carriage is reciprocating.

5. The invention according to claim 4 in which said die is the relatively stationary element of the die-cutting couple and in which the spaced pressure rolls mounted on the carriage constitute the relatively movable element of the couple.

References Cited in the file of this patent
UNITED STATES PATENTS

| | | |
|---|---|---|
| 2,581,937 | Secrest | Jan. 8, 1952 |
| 2,733,766 | Wilke | Feb. 7, 1956 |
| 2,737,238 | Rowland | Mar. 6, 1956 |
| 2,757,728 | De Lisi et al. | Aug. 7, 1956 |